US008817689B2

(12) United States Patent
Haustein et al.

(10) Patent No.: US 8,817,689 B2
(45) Date of Patent: Aug. 26, 2014

(54) METHOD OF TRANSMITTING DATA IN A RADIO NETWORK, RADIO NETWORK AND RECEIVING STATION

(75) Inventors: Thomas Haustein, Potsdam (DE); Venkatkumar Venkatasubramanian, Berlin (DE)

(73) Assignee: Nokia Siemens Networks Oy, Espoo (FI)

(*) Notice: Subject to any disclaimer, the term of this patent is extended or adjusted under 35 U.S.C. 154(b) by 67 days.

(21) Appl. No.: 13/125,880

(22) PCT Filed: Oct. 30, 2009

(86) PCT No.: PCT/EP2009/064395
§ 371 (c)(1),
(2), (4) Date: May 23, 2011

(87) PCT Pub. No.: WO2010/049527
PCT Pub. Date: May 6, 2010

(65) Prior Publication Data
US 2011/0222464 A1    Sep. 15, 2011

(30) Foreign Application Priority Data
Oct. 31, 2008  (EP) .................................. 08105712

(51) Int. Cl.
*H04B 7/14* (2006.01)
*H04J 1/10* (2006.01)
*H04J 3/08* (2006.01)
*H04W 4/00* (2009.01)

(52) U.S. Cl.
USPC .......................................... 370/315; 370/328

(58) Field of Classification Search
None
See application file for complete search history.

(56) References Cited

U.S. PATENT DOCUMENTS

| 5,437,059 | A | 7/1995 | Murakami et al. ............. 455/512 |
| 5,542,119 | A | 7/1996 | Grube et al. .................. 455/51.2 |
| 7,184,703 | B1* | 2/2007 | Naden et al. ..................... 455/10 |
| 7,400,856 | B2* | 7/2008 | Sartori et al. ..................... 455/7 |
| 8,018,893 | B2* | 9/2011 | Sartori et al. ................. 370/329 |
| 8,165,545 | B2* | 4/2012 | Ben-Ayun et al. ............. 455/140 |
| 2006/0120477 | A1* | 6/2006 | Shen et al. ..................... 375/267 |
| 2006/0154621 | A1* | 7/2006 | Giebel et al. .................. 455/101 |
| 2006/0164972 | A1 | 7/2006 | van Rensburg et al. ...... 370/208 |

(Continued)

FOREIGN PATENT DOCUMENTS

| DE | 102 41 959 A1 | 3/2004 |
| DE | 103 01 556 A1 | 8/2004 |

(Continued)

*Primary Examiner* — Suk Jin Kang
(74) *Attorney, Agent, or Firm* — Harrington & Smith

(57) ABSTRACT

In accordance with the invention there is at least a method of receiving data streams from at least two sending stations, wherein the data streams are sent to a receiving station; storing said data streams; and re-sending from the stored data streams a repeat of one or more data streams of the data streams sent to the receiving station, wherein the re-sending the repeat of the one or more data streams comprises selecting a weaker at least one data stream of the data streams and re-sending the weaker at least one data stream to the receiving station. Further, there is receiving at least two data streams; storing said received at least two data streams; receiving a repeat of one or more data streams re-sent by at least one relay station; and combining the received at least two data streams and the received repeat of the one or more data streams.

19 Claims, 3 Drawing Sheets

(56) References Cited

U.S. PATENT DOCUMENTS

| | | | |
|---|---|---|---|
| 2006/0239222 A1* | 10/2006 | Kim et al. | 370/328 |
| 2007/0010196 A1* | 1/2007 | Periyalwar et al. | 455/7 |
| 2007/0036071 A1* | 2/2007 | Herdin | 370/210 |
| 2007/0086512 A1* | 4/2007 | Can et al. | 375/148 |
| 2007/0217433 A1* | 9/2007 | Doppler et al. | 370/400 |
| 2008/0244350 A1* | 10/2008 | de Carvalho et al. | 714/748 |
| 2008/0250293 A1* | 10/2008 | Taori et al. | 714/748 |
| 2008/0267111 A1* | 10/2008 | Lim et al. | 370/315 |
| 2008/0279135 A1* | 11/2008 | Periyalwar et al. | 370/315 |
| 2009/0003257 A1* | 1/2009 | Kumar et al. | 370/314 |
| 2009/0005104 A1* | 1/2009 | Wang et al. | 455/522 |
| 2009/0116419 A1* | 5/2009 | Chong et al. | 370/312 |
| 2009/0116422 A1* | 5/2009 | Chong et al. | 370/315 |
| 2009/0175214 A1* | 7/2009 | Sfar et al. | 370/315 |
| 2009/0262678 A1* | 10/2009 | Oyman et al. | 370/315 |
| 2010/0039980 A1* | 2/2010 | Unger | 370/315 |
| 2010/0080139 A1* | 4/2010 | Palanki et al. | 370/252 |
| 2010/0080166 A1* | 4/2010 | Palanki et al. | 370/315 |
| 2010/0262885 A1* | 10/2010 | Cheng et al. | 714/749 |
| 2011/0002244 A1* | 1/2011 | Wolfgang et al. | 370/280 |
| 2011/0038436 A1* | 2/2011 | Kim et al. | 375/260 |
| 2011/0103339 A1* | 5/2011 | Kim et al. | 370/329 |
| 2011/0207397 A1* | 8/2011 | Wang et al. | 455/7 |

FOREIGN PATENT DOCUMENTS

| | | |
|---|---|---|
| DE | 10 2005 049 103 A1 | 4/2007 |
| EP | 1 392 004 A2 | 2/2004 |
| WO | 2004/064276 A1 | 7/2004 |

\* cited by examiner

METHOD OF TRANSMITTING DATA IN A RADIO NETWORK, RADIO NETWORK AND RECEIVING STATION

CROSS REFERENCE TO RELATED APPLICATION

This application relates to and claims priority to PCT Application No. PCT/EP2009/064395 filed Oct. 30, 2009, which claims priority to EP Application 08105712.7 filed Oct. 31, 2008, the contents of which are hereby incorporated by reference.

TECHNICAL FIELD

The invention relates to a method of transmitting data in a radio network with at least two sending stations, at least one relay station and at least one receiving station. Furthermore, the invention relates to a radio network and a receiving station to implement the inventive method.

BACKGROUND

In modern telecommunication networks there is a requirement to deliver high data rate over a wide area. A proper method to increase data rate is to increase the signal levels and thus increase the signal to noise ratio (SNR). As the output power of sending stations normally is limited, the received power reduces over a wide area. Relay stations are provided in some networks for this reason. These relay stations receive the data sent by the sending station and re-send the data with a signal level higher than the level of the received signals.

In addition, more sophisticated methods to improve the data transmission exist in modern networks, such as antenna diversity and multiplexing, which uses multiple antennas for the sender and/or the receiver. This technology is also referred to as "Multiple Input Multiple Output", MIMO for short. MIMO technology enhance link throughput by spatially multiplexing the data streams and has attracted attention in wireless communications, since it offers significant increases in data throughput without additional bandwidth or transmit power. This is achieved by higher spectral efficiency (more bits per second per hertz of bandwidth) and link reliability or diversity (reduced fading).

In the original form such techniques were proposed for point to point links providing multiplexing gains to increase the loadable throughput. However, recently these techniques have been proposed to address the problem of interference mitigation in MIMO downlinks for systems such as LTE (Long Term Evolution) and WiMAX (Worldwide Interoperability for Microwave Access). This development extends the MIMO techniques to point-multipoint systems, also termed cooperative MIMO.

One example for the MIMO data transmission is disclosed in EP1392004, which is related to a method of transmitting data signals from at least one transmitting terminal with a spatial multiplexing means to at least two receiving user terminals, each provided with spatial diversity receiving means.

Furthermore, US 2006/0164972 discloses a scheduler for scheduling downlink transmissions of orthogonal frequency division multiple access (OFDMA) signals using spatially directed beams to a plurality of subscriber stations in a wireless network. The scheduler then schedules the downlink transmissions as a function of frequency, time, and space. The scheduler further schedules downlink transmissions to a first subscriber station based on a first null space associated with at least one subscriber station previously scheduled to receive.

However, in spite of all efforts which have been made for radio networks so far, there is still room for improvement. Accordingly, the objective of the invention is to provide a method and a radio network which provide for data transmission with cooperating transmitter stations and relay stations for range extension.

SUMMARY

According to the invention, this objective is achieved by at least a method according to claim 1.

Accordingly, a method of transmitting data in a radio network with at least two sending stations, at least one relay station and at least one receiving station is disclosed, comprising the steps of:
a) that at least two sending stations simultaneously send said data;
b) that at least one relay station receives said data from the at least two sending stations and stores said data;
c) that at least one receiving station receives said data from the at least two sending stations and stores said data;
d) that at least one relay station re-sends said stored data;
e) that at least one receiving station receives said data from the at least one relay station; and
f) that at least one receiving station combines data streams received in steps c) and e).

Furthermore, a radio network is disclosed, comprising:
a) at least two sending stations designed to simultaneously send data and
b) at least one relay station designed to receive, store and re-send said data from the at least two sending stations;

Finally, a receiving station is disclosed, comprising:
  means for receiving and storing data simultaneously sent by at least two sending stations and for receiving said data re-sent by at least one relay station and
  means for combining the received data streams.

The invention offers the additional advantage that data transmission errors occur less often why the transmission speed can be increased. The reason is that the receiving station receives data streams from multiple sources and can combine these streams to an almost optimal received data stream.

Preferred embodiments of the invention can be found in the dependent claims as well as in the description and the figures.

It is advantageous if the at least one relay station and the at least two sending stations simultaneously re-send said data in step d) and the at least one receiving station receives said data from the at least one relay station and the at least two sending stations in step e). In this embodiment the redundancy of the data streams is even more increased, although the number of the sending stations stays the same. Accordingly, the quality of data transmission is even further enhanced.

It is also advantageous if the relay station re-sends data only from that sending station or sending stations, from which it receives the weakest signal or signals. Redundancy normally means increased workload on the entities of a network. To reduce the workload on a relay station, only the weakest signal or signals are repeated, assuming that the stronger ones are correctly received at the receiving stations anyway.

Furthermore, it is advantageous if the combination in step f) is performed by means of maximum ratio combination. In maximum ratio combining each signal branch is multiplied by a weight factor that is proportional to its signal amplitude. Accordingly, branches with strong signals are amplified, while weak signals are attenuated. Hence, maximum ratio combination is a proper possibility to compute data streams from different sources.

In yet another beneficial embodiment, the data transmission is performed by means of block diagonalised transmission. In MIMO systems, a transmitter sends multiple streams by multiple transmit antennas which can be mathematically described by matrices. The transmit streams go through a matrix channel which consists of multiple paths between multiple transmit antennas at the transmitter and multiple receive antennas at the receiver. Then, the receiver gets the received signal vectors by the multiple receive antennas and decodes the received signal vectors into the original information. Block diagonalized transmission is a proper possibility to transmit data to multiple receiver stations simultaneously.

Furthermore, it is beneficial if the at least one relay station receives said data from the at least two sending stations, combines said data and stores said data in step b). In this embodiment data is not transparently transmitted (i.e. repeated) by the relay stations but there is a preprocessing of the repeated data. Here the redundancy in the data received by the sending station is used to prepare an optimal data stream to be sent to a mobile station. Again maximum ratio combiner, or linear demultiplexing receivers may be used for this purpose.

In an advantageous embodiment of the invention, the at least one relay station indicates the transmission format used for data transmission to the receiving station. In this way, the receiving station(s) know in which format the data to be transmitted is and can perform related setup procedures if applicable.

In yet another advantageous embodiment of the invention, the at least one relay station filters incoming signals in such a way that one or more of the group of interference suppression, noise suppression or interference cancellation is enabled. In this embodiment, incoming signals are processed to obtain an almost optimal signal quality respectively data quality in the at least one relay station, from which in turn also the re-transmission of said data benefits.

Furthermore, it is advantageous if the at least one relay station corrects a phase noise and/or a frequency offset. In this way, an even increased signal quality respectively data quality may be obtained in the at least one relay station. Again, the re-transmission of the data benefits from this signal processing.

In this context it is also advantageous if the at least two sending stations use two layers of precoding, wherein an outer precoder is used to block diagonalise the link between the at least one relay station to at least two receiving stations and an inner precoder block diagonalises the link between the at least two sending stations to the at least two receiving stations.

Finally, it is advantageous if at least two sending stations transmit first data to at least four receiving stations via at least two relay stations and at least one receiving station and wherein at least further two sending stations transmit second data to at least four receiving stations via at least two relay stations and at least one receiving station. In this way, the relay stations may be shared between a multitude of sending stations.

It should be noted that the embodiments and advantages which have been disclosed for the inventive method mutatis mutandis apply to the inventive radio network and the inventive receiving station and vice versa.

Means for the radio network and the relay station which are used to implement the invention may be embodied in software and/or hardware. While the function of these means have a rather physical meaning if they are embodied in hardware, they have a rather functional meaning if they are embodied in software.

The embodiments of the invention disclosed hereinbefore can be combined in any desired way.

BRIEF DESCRIPTION OF THE DRAWINGS

These and other aspects of the invention are apparent from and will be elucidated with reference to the embodiments described and shown in the schematic Figures hereinafter.

DETAILED DESCRIPTION

In the Figs the same elements and elements with the same function are referenced with the same reference sign if not stated otherwise.

Figure 1:
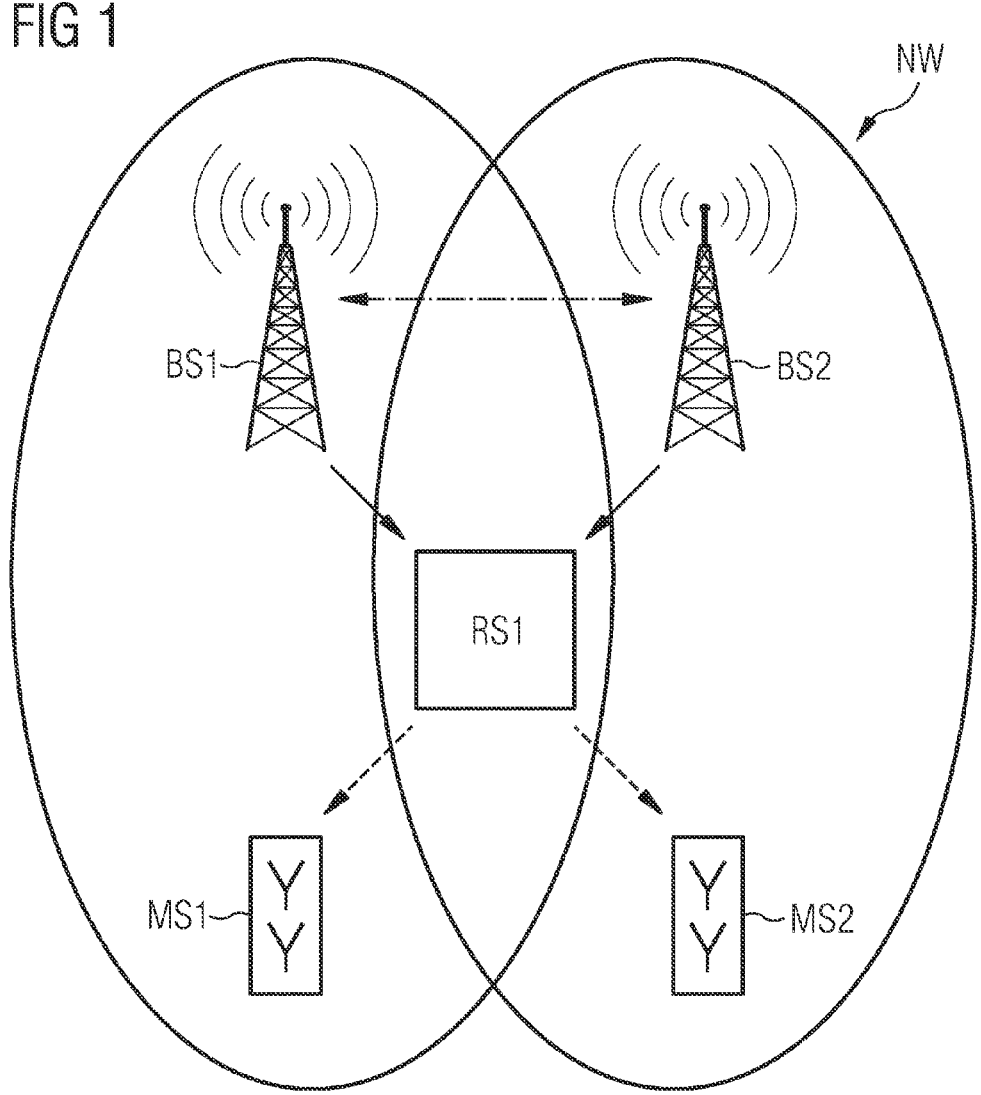
FIG. 1 shows a network comprising 2 base stations and 1 relay station.

FIG. 1 shows a radio network NW, comprising a first and a second base station BS1 and BS2, which act as sending stations in the following example, a relay station RS1, and a first and a second mobile station MS1 and MS2, which act as receiving stations in the following example. Both base stations BS1 and BS2 send data to the mobile stations MS1 and MS2 via the relay station RS1 which is indicated by arrows (from base stations BS1, BS2 to relay station RS1 with bold arrows, from relay station RS1 to mobile stations MS1, MS2 with dashed arrows). Furthermore, a cooperative transmission of data of the first and the second base station BS1 and BS2 is indicated by an additional dash-dotted arrow between the base stations BS1 and BS2. It should be noted that this cooperation is not necessarily done by radio communication as wired communication between the base stations BS1 and BS2 is applicable as well. In this example each base station BS1 and BS2 comprises 2 antennas, each mobile station MS1 and MS2 comprises 2 antennas as well, and the relay station RS1 comprises 4 antennas.

The function of the arrangement depicted in FIG. 1 is as follows.

In a first step a) the first and the second base station BS1 and BS2 simultaneously send data via their radio interfaces. This data propagates and reaches the relay station RS1, most probable at different points in time. So, in a second step b) the relay station RS1 receives said data from the base stations BS1 and BS2 and stores said data. As the data propagates further, also the mobile stations MS1 and MS2 receive said data from the base stations BS1 and BS2 (also most probable at different points in time) and store said data in a step c). For the sake of brevity, just the method for the first mobile station MS1 is depicted hereinafter. However, the procedure is equivalent for the second mobile station MS2. It also should be noted, that the steps b) and c) also may be executed in a different order, depending on how long the data transmission from the base stations BS1 an BS2 to a particular entity of the network NW may take. In a fourth step d) the relay station RS1 re-sends said stored data. For the sake of brevity, data is simply repeated in this example. However, processing of the data within the relay station RS1 is not excluded. In a fifth step e) the mobile station MS1 receives the data from the relay station RS1 and combines the data received in step c) and data received in step e) in a sixth step f).

For this combination step f) a number of possibilities are available, for example Selection Diversity Combining (SDC) which uses the signal with the best characteristics, probably the strongest signal, for the further processing. A further possibility is Equal Gain Combining (EGC) which combines the signals of all antennas. Finally, the combination step g) may be performed by means of Maximum Ratio Combining (MRC) which is the most effective way to combine signals from different sources. By weighting strong signals with a high weighting factor and weak signals with a low weighting factor, an almost optimal signal can be obtained or parallel/serial iterative decoding.

In an advantageous embodiment of the invention the inventive method is improved by amended steps d) and e) (the arrangement depicted in FIG. 1 stays the same). In step d) the relay station RS1 and one of the base stations BS1 and BS2 re-send the data, wherein the relay station repeats the data from both base stations BS1 and BS2. Accordingly, the first mobile station MS1 receives signals from three sources in step e), i.e. one from the first base station BS1 and two from the relay station RS1. Hence, five data streams (compared to four streams in the example hereinbefore) are available for the combination step f), which provides for an even better data reception. Accordingly, there is a cooperative data transmission with 8 antennas, 4 from the relay station RS and 4 from the base stations BS1 and BS2.

In yet another advantageous embodiment of the invention, the inventive method of the first example is improved by another amended steps d) and e) (the arrangement depicted in FIG. 1 stays the same again). In step d) the relay station RS1 repeats the signal of just one base station BS1 or BS2, namely the weaker signal of both base stations BS1 and BS2. The weaker signal could be a higher layer of a video stream. The relay station could repeat a smaller number of streams from cooperating base stations. In addition, both base stations BS1 and BS2 re-send the data. Accordingly, the first mobile station MS1 receives signals from three sources in step e) again, i.e. one from the first base station BS1, one from the second base station BS2 and one from the relay station RS1. Hence, five data streams (compared to four streams in the first example) are available for the combination step f) again, which provides for proper data reception. Accordingly, there is a cooperative data transmission with 8 antennas, 4 from the relay station RS and 4 from the base stations BS1 and BS2. Compared to the situation in the second example, the work load of the relay station RS1 is reduced in this example because just the weaker signal or lower layer of data from both base stations BS1 and BS2 is repeated.

Figure 2:
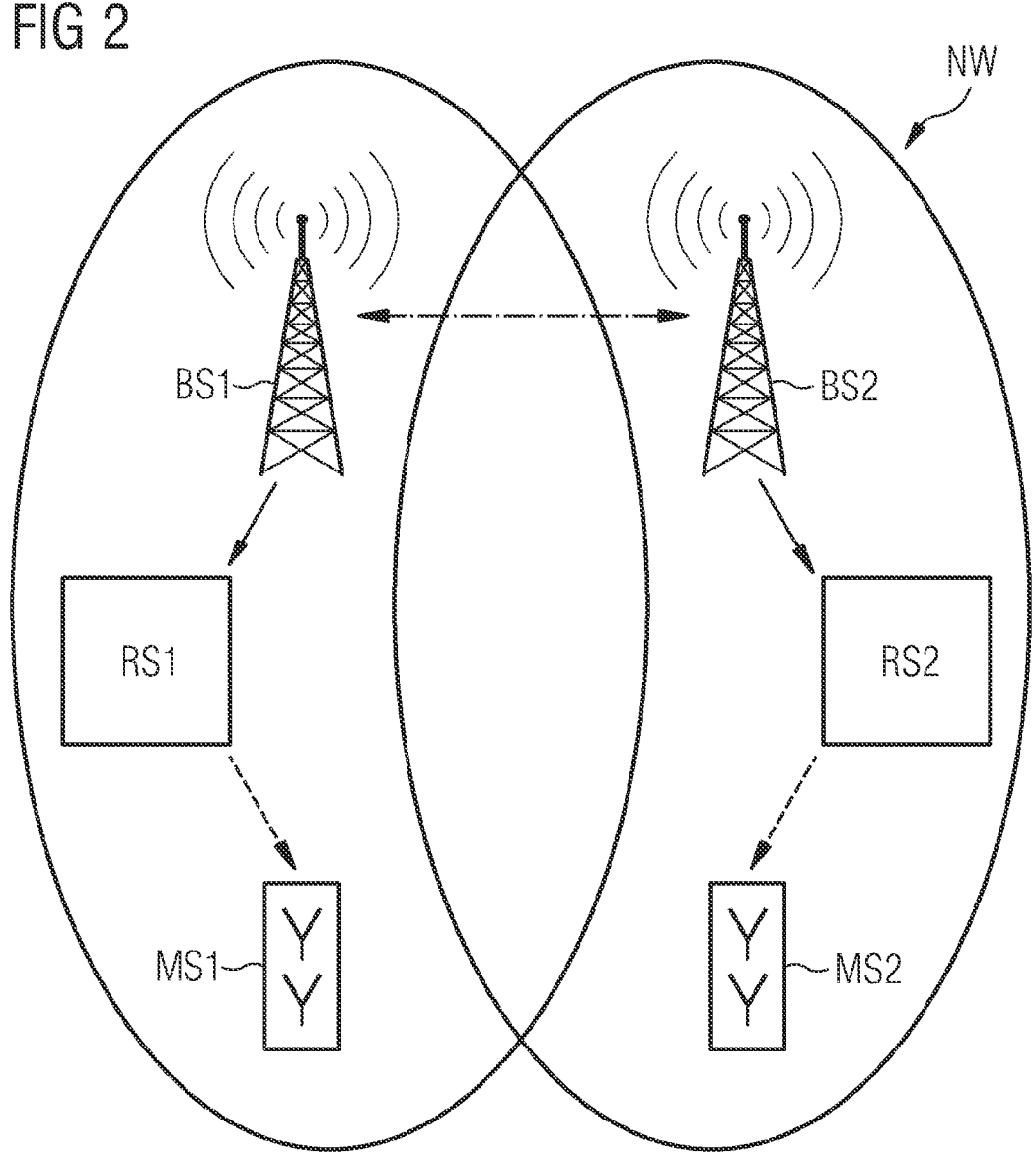
FIG. 2 shows a network comprising 2 base stations and 2 relay stations.

FIG. 2 shows another example of a radio network NW, comprising a first and a second base station BS1 and BS2, which act as sending stations in the following example, a first and a second relay station RS1 and RS2, and a first and a second mobile station MS1 and MS2, which act as receiving stations in the following example. The first base station BS1 sends data to the first mobile station MS1 via the first relay station RS1 whereas the second base station BS2 sends data to the second mobile station MS2 via the second relay station RS3 which is indicated by arrows. Furthermore, a cooperative transmission of data of the first and the second base station BS1 and BS2 is indicated by an additional arrow between the base stations BS1 and BS2. Again this cooperation may take place by radio communication and/or wired communication.

In the distributed relay scenario as shown in FIG. 2, the same protocol as used for a centrally located relay RS1 with 4 antennas cannot be used. The reason is that the two distributed relay stations RS1 and RS2 in FIG. 2 cannot cooperatively decode the transmission streams from the two base stations BS1 and BS2 and could again re-introduce interference at the mobiles stations MS1 and MS2. Accordingly, a number of schemes for the data transmission in an network NW as shown in FIG. 2 are proposed hereinafter.

1) Amplify and Forward:

Let $H_1$ be the 4×4 channel between the two base stations BS1 and BS2 and the two relay stations RS1 and RS2. $H_2$ is the 2×4 channel from the two relay stations RS1 and RS2 to each mobile station MS1 and MS2. Then the combined multi-hop channel is $$H_{BD}=H_2\sqrt{diag(\alpha)}H_1$$

where $\alpha$ is the vector containing the scalar amplification factors used at the relay station RS1 or RS2 individually for each receiver antenna. A filter for the combined channel is used at the receiver taking into account the interference amplification and noise amplification at the relay stations RS1 and RS2. Block diagonalization is performed over the combined channel $H_{BD}$ at the base stations BS1 and BS2. Let the precoding matrix used at a base station BS1 or BS2 be $$Q=[Q_A Q_B]$$

where $Q_A$, $Q_B$ are the precoding matrices for each mobile station MS1 and MS2. Because of the channel outdating, let $$\tilde{H}_1=\tilde{H}_{BD}Q_A$$

be the effective channel between a base station BS1, BS2 and a mobile station MS1, MS2, and $$\tilde{H}_{i1}=\tilde{H}_{BD}Q_B$$

is the resulting leaking interference from the two streams for the other mobiles station MS1, MS2.

In addition, noise amplification and interference amplification occurs at each relay station RS1 and RS2 which have to be considered.

Let $H_{iR}$ be the interference channel received at the two relay stations RS1 and RS2 and $H_{iD}$ is the interference channel received at the mobile station MS1, MS2. Then the received filter at a mobile station MS1, MS2 is given as $$W=(\tilde{H}_1)^H(\tilde{H}_1(\tilde{H}_1)^H+H_2 diag(\alpha)$$
$$\overline{N}(H_2)^H+H_X(H_X)^H+H_{iD}(H_{iD})^H+\tilde{H}_{i1}(\tilde{H}_{i1})^H+\overline{N}_D)^{-1}$$

where $$H_X=H_2\sqrt{diag(\alpha)}H_{iR}$$

It should be noted that this mechanism is also applicable to the case of multihop block diagonalized transmission by means of just one relay RS1, equipped with 4 antennas, in the same amplify and forward procedure.

2) Filter and Forward:

In the amplify and forward case, the relay stations RS1 and RS2 amplify both interference and noise and forwards them to the mobile stations MS1 and MS2 along with the signal. In particular if the Signal Interference Noise Ratio (SINR) is low at the relay station RS1, RS2, the implementation of a MMSE-IRC filter (MMSE=minimum mean square error; IRC=interference rejection combining) at the relay station RS1, RS2 is advantageous, so as to suppress the interference and noise power before forwarding the data to the mobile station MS1, MS2. For this reason, the end to end operation for two mobile stations MS1 and MS2 is modified as follows.

$$y=\begin{bmatrix}H_{2A}\\H_{2B}\end{bmatrix}\begin{bmatrix}W_{1A} & 0\\0 & W_{1B}\end{bmatrix}\begin{bmatrix}H_{1A} & H'_{1A}\\H'_{1B} & H_{1B}\end{bmatrix}[Q_A \quad Q_B]x$$

where $W_{1A}$, $W_{1B}$ are the 2×2 filters used each relay station RS1, RS2 to suppress noise and interference. The filters consider the streams from the base station BS1, BS2 intended for other user as interference. The effective channel is now treated as $$H_{\mathit{eff}} = \begin{bmatrix} H_{2A} \\ H_{2B} \end{bmatrix} \begin{bmatrix} W_{1A} & 0 \\ 0 & W_{1B} \end{bmatrix} \begin{bmatrix} H_{1A} \\ H_{1B} \end{bmatrix}$$

The filters are designed as $$W_{1A} = (H_{1A})^H (H_{1A}(H_{1A})^H + H'_{1A}(H'_{1A})^H + \overline{N}^{(1,2)}{}_R + H^{(1,2)}{}_{iR}(H^{(1,2)}{}_{iR})^H)$$

$$W_{1B} = (H_{1B})^H (H_{1B}(H_{1B})^H + H'_{1B}(H'_{1B})^H + \overline{N}^{(3,4)}{}_R + H^{(3,4)}{}_{iR}(H^{(3,4)}{}_{iR})^H)$$

The precoding matrix $$Q = [Q_A Q_B]$$

is designed to block-diagonalize the effective channel $H_{\mathit{eff}}$. The receiver filter is then given by $$W_D = (\tilde{H}_{A\mathit{eff}})^H (\tilde{H}_{A\mathit{eff}}(\tilde{H}_{A\mathit{eff}})^H + H_2 W \overline{N}_R W^H (H_2)^H + H_X (H_X)^H + H_{iD}(H_{iD})^H + \tilde{H}_{iA\mathit{eff}}(\tilde{H}_{iA\mathit{eff}})^H +$$

where $$H_X = H_2 W H_{iR}$$

$$W = \begin{bmatrix} W_{1A} & 0 \\ 0 & W_{1B} \end{bmatrix}$$

3) Equalize and Forward:

In this third strategy, two layers of precoding are used at the base station BS1, BS2. An outer precoder is used to block diagonalize the link between the relay station RS1, RS2 to the mobile stations MS1 and MS2 while an inner precoder block diagonalizes the link between the base station BS1, BS2 to two relay stations RS1 and RS2. This is described as follows:

$$y = \begin{bmatrix} H_{2A} \\ H_{2B} \end{bmatrix} \begin{bmatrix} W_{1A} & 0 \\ 0 & W_{1B} \end{bmatrix} \begin{bmatrix} H_{1A} & H'_{1A} \\ H'_{1B} & H_{1B} \end{bmatrix} [Q_{1A} \ Q_{1B}][Q_{2A} \ Q_{2B}]x$$

The result is an equivalent channel as shown below:

$$\hat{H} = \begin{bmatrix} H_{2A} \\ H_{2B} \end{bmatrix} \begin{bmatrix} W_{1A} & 0 \\ 0 & W_{1B} \end{bmatrix} \begin{bmatrix} \tilde{H}_{1A} & 0 \\ 0 & \tilde{H}_{1B} \end{bmatrix} [Q_{2A} \ Q_{2B}]$$

The 2×2 matrices $\tilde{H}_{1A}$, $\tilde{H}_{1B}$ are equalized using MMSE-IRC filters $W_{1A}$, $W_{1B}$. Phase noise and frequency offset corrections are applied at the relay station RS1, RS2 as part of the equalization.

4) Detect and Forward

Post-equalization and further noise suppression are possible by a binning process. This is because the transmitted symbols at a base station BS1, BS2 belong to a super-constellation given by $$\tilde{x} = [Q_{2A} \ Q_{2B}] \begin{bmatrix} x_1 \\ x_2 \\ x \\ x_4 \end{bmatrix}$$

Note that matrix $$[Q_{2A} Q_{2B}]$$

is designed to block diagonalize the second link given by $$H_2 = \begin{bmatrix} H_{2A} \\ H_{2B} \end{bmatrix}$$

If the alphabet size of each symbol $x_i$ is $C_i$, this gives $$\prod_{i=1\ldots 4} C_i$$

possible complex constellation points. By treating noise and interference as circular symmetric distributed, the real and imaginary components of the received symbols are sorted at the relay receiver first. Then, these values are distributed in $$\prod_{i=1\ldots 4} C_i$$

bins and averaging is performed within each bin. This gives an estimate of the transmitted super-constellation by the base station BS1, BS2 at the relay station BS1, BS2. In the second step, each received symbol is mapped to one of the super-constellation points based on minimum Euclidean distance. The detected super-constellation symbols are forwarded to the mobile station MS1, MS2 by the relay station RS1, RS2.

Figure 3:
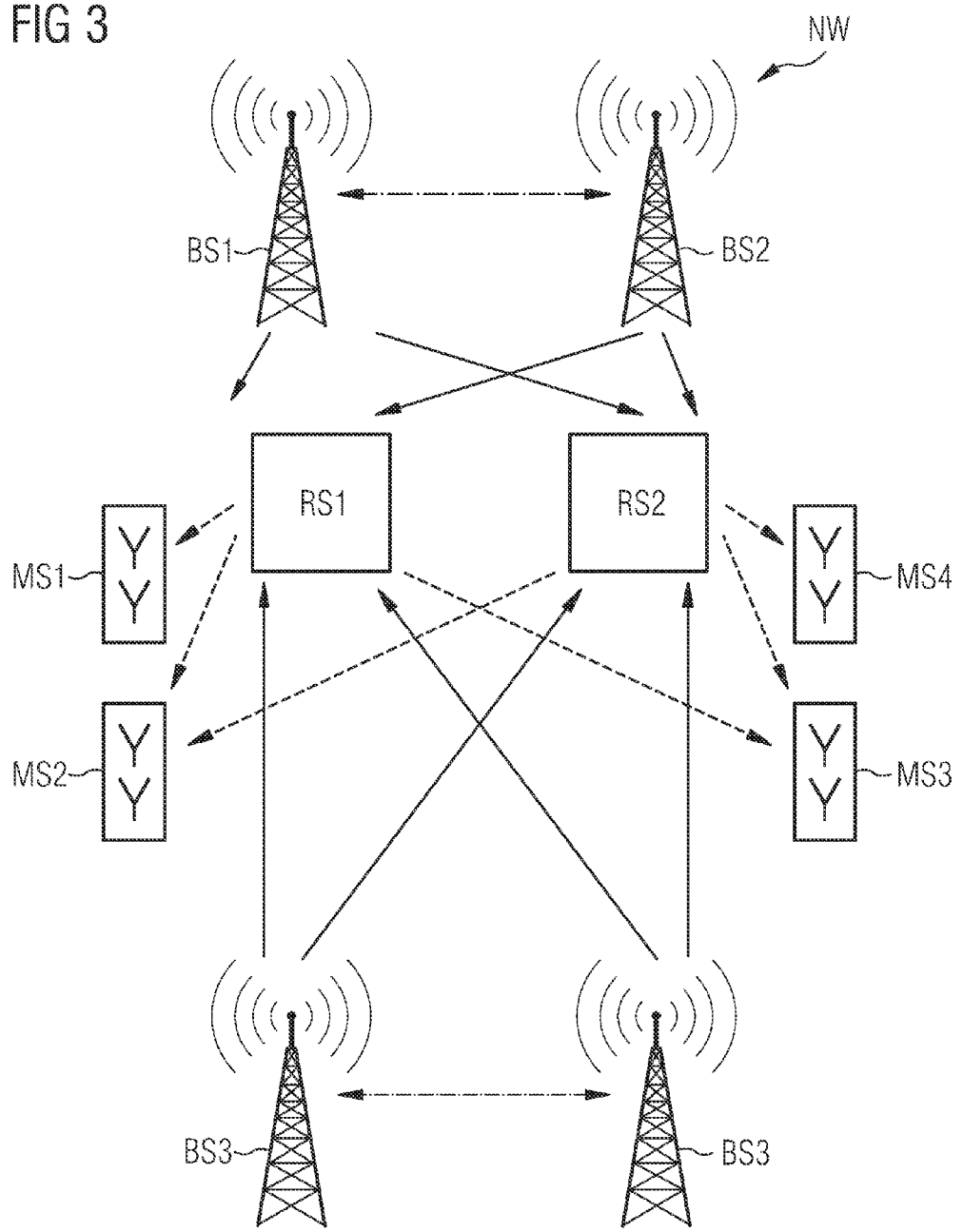
FIG. 3 shows a network with a plurality of base stations, relay stations and mobile stations.

FIG. 3 depicts another preferred embodiment of the invention and shows four base stations BS1 ... BS4 (each having 2 transmitters), four mobile stations MS1 ... MS4 (each having 2 receivers) and two relay stations RS1, RS2 (each having 4 receivers and 6 transmitters). Again, the base stations BS1 ... BS4 act as sending stations and the mobile stations MS1 ... MS4 act as receiving stations in the following example. All base stations BS1 ... BS4 send data to the relay stations RS1, RS2 which is indicated by bold arrows. Data sent from the relay stations RS1, RS2 to the mobile stations MS1 ... MS4 is depicted with dashed arrows. Furthermore, a cooperative transmission of data of the first and the second base station BS1 and BS2, which send data intended for the mobile stations MS1 and MS2, and the third and the fourth base station BS3 and BS4, which send data intended for the mobile stations MS3 and MS4, is indicated by additional dash-dotted arrows.

In this embodiment of the invention, two layers of interference-free transmission mechanisms are employed.

a) Vertical block diagonalization, by which base stations BS1 ... BS4 orthogonalize transmission to a first group of the mobile stations MS1 and MS2 and a second group of the mobile stations MS3 and MS4 via precoding on null space.

b) Horizontal block diagonalization, by which the relay stations RS1 and RS2 perform block diagonalized transmission to said first and second group of the mobile stations MS1/

MS2 and MS3/MS4 via precoding on null space. This is provided by the following end to end process $$y = \begin{bmatrix} H_{2A} \\ H_{2B} \end{bmatrix} \begin{bmatrix} R_1 & 0 \\ 0 & R_2 \end{bmatrix} \begin{bmatrix} W_{1A} & 0 \\ 0 & W_{1B} \end{bmatrix} \begin{bmatrix} \tilde{H}_{1A} & 0 \\ 0 & \tilde{H}_{1B} \end{bmatrix} [Q_{2A} \ Q_{2B}] x$$

$R_1$, $R_2$ are 6×2 matrices which mutually avoid interference between said groups MS1/MS2 and MS3/MS4. $H_{2A}$, $H_{2B}$ are 2×12 matrices from two relay stations RS1, RS2 to two mobile stations MS1 . . . MS4. The matrix $[Q_{2A} \ Q_{2B}]$ is designed to block diagonalize the effective channel $$\hat{H} = \begin{bmatrix} H_{2A} \\ H_{2B} \end{bmatrix} \begin{bmatrix} R_1 & 0 \\ 0 & R_2 \end{bmatrix}$$

between the mobile stations MS1 and MS2 if a binning-detector is employed at a relay station RS1, RS2. Otherwise, it block diagonalizes the effective channel $$\hat{H} = \begin{bmatrix} H_{2A} \\ H_{2B} \end{bmatrix} \begin{bmatrix} R_1 & 0 \\ 0 & R_2 \end{bmatrix} \begin{bmatrix} W_{1A} & 0 \\ 0 & W_{1B} \end{bmatrix} \begin{bmatrix} \tilde{H}_{1A} & 0 \\ 0 & \tilde{H}_{1B} \end{bmatrix}$$

In a first step a) the base stations BS1 . . . BS4 simultaneously send data in two cooperative groups BS1/BS2 and BS3/BS4 via their radio interfaces. This data propagates and reaches the relay stations RS1, RS2. In a second step b) the relay stations RS1, RS2 receive said data from the base stations BS1 . . . BS4 (4 data streams in total) and store said data. Also the mobile stations MS1 . . . MS4 receive said data from the base stations BS1 . . . BS4 and store said data in a step c). It should be noted, that the steps b) and c) also may be executed in a different order, depending on how long the data transmission from the base stations BS1 . . . BS4 to a particular entity of the network NW may take. In a fourth step d) the relay stations RS1, RS2 re-sends said stored data. In a fifth step e) the mobile stations MS1 . . . MS4 receive the data from the relay stations RS1 and RS2 and combine the data received in step c) and data received in step e) in a sixth step g).

It should be noted that the base stations BS1 and BS2 and the mobile stations MS1 and MS2 may change their role in the inventive method, that means the mobile stations MS1 and MS2 may become the sending stations whereas the base stations BS1 and BS2 may become the receiving stations. Accordingly, the inventive method works for both the downlink data traffic (as have been shown in the examples hereinbefore) and for uplink data traffic if the function of the base stations BS1 and BS2 and the mobile stations MS1 and MS2 is swapped in mind.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The verb "comprise" and its conjugations do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method, comprising:
   receiving, by a relay station, at least two data streams from at least two sending stations, wherein the at least two data streams are sent to one receiving station;
   storing by the relay station said at least two data streams; and
   re-sending from the stored data streams a repeat of one or more data streams of the at least two data streams sent to the receiving station, wherein the re-sending the repeat of the one or more data streams comprises selecting a weaker at least one data stream of the at least two data streams and re-sending only the weaker at least one data stream of the at least two data streams to the receiving station.

2. The method as claimed in claim 1, wherein the relay station indicates a transmission format used for data transmission of the data streams to the receiving station.

3. The method as claimed in claim 1, wherein the data streams received from the at least two sending stations are using block diagonalized transmission.

4. The method as claimed in claim 1, wherein the relay station receives said data streams from the at least two sending stations, combines said data streams, and stores said combined data.

5. The method as claimed in claim 1, comprising: re-sending the weaker at least one data stream simultaneous with the at least two data streams which are re-sent from the at least two sending stations to the receiving station.

6. The method as claimed in claim 1, wherein the relay station filters the received data streams in such a way that one or more of interference suppression, noise suppression or interference cancellation is enabled, and wherein the relay station corrects at least one of a phase noise and a frequency offset of said data streams.

7. A non-transitory computer-readable medium storing computer programs code, the computer program code executed by at least one processor to perform the method as claimed in claim 1.

8. An apparatus, comprising:
   a processor; and
   a memory including computer program code, where the memory and the computer program code are configured, with the processor, to cause the apparatus to at least:
   receive and store at least two data streams sent by at least two sending stations;
   receive a repeat of only a weaker one or more data streams of the at least two data streams as re-sent by at least one relay station;
   combine the received at least two data streams from the at least two sending stations and the received repeat of the weaker one or more data streams from the at least one relay station at the apparatus.

9. The apparatus as claimed in claim 8, wherein the memory including the computer program code is configured with the processor to cause the apparatus to receive simultaneously said data sent by the at least one relay station and at least one of the at least two sending stations.

10. The apparatus as claimed in claim 8, wherein the memory including the computer program code is configured with the processor to cause the apparatus to perform the combining the received data streams using a maximum ratio combination.

11. The apparatus station as claimed in claim 8, wherein the apparatus receives an indication of a transmission format used for data transmission of the data streams from the at least one relay station.

12. A method, comprising:
- receiving by a receiving station at least two data streams from at least two sending stations;
- storing by the receiving station said received at least two data streams from the at least two sending stations;
- receiving a repeat of only a weaker one or more data streams, of the at least two data streams, re-sent by at least one relay station; and
- combining the received at least two data streams from the at least two sending stations and the received repeat of the weaker one or more data streams from the at least one relay station at the receiving station.

13. The method as claimed in claim 12, wherein the combining the received data streams is performed using maximum ratio combination.

14. The method as claimed in claim 12, wherein said data streams from the at least one relay station and said data streams from the at least two sending stations are received simultaneously by the receiving station.

15. The method as claimed in claim 12, wherein the receiving station receives an indication of a transmission format used for data transmission of the data streams from the relay station.

16. A non-transitory computer-readable medium storing computer programs code, the computer program code executed by at least one processor to perform the method as claimed in claim 12.

17. An apparatus, comprising:
- a processor; and
- a memory including computer program code, where the memory and the computer program code are configured, with the processor, to cause the apparatus to at least:
- receive and store at least two data streams from at least two sending stations, wherein the at least two data streams are sent to a receiving station; and
- re-send from the stored data streams a repeat of only a weaker one or more data streams of the at least two data streams sent to the receiving station, wherein the re-sending the repeat of the weaker one or more data streams comprises selecting the weaker one or more data streams of the at least two data streams and re-sending the weaker one or more data streams to the receiving station.

18. The apparatus as claimed in claim 17, wherein the apparatus indicates a transmission format used for data transmission of the data streams to the receiving station.

19. The apparatus as claimed in claim 17, wherein the data streams received from the at least two sending stations are using block diagonalized transmission.

\* \* \* \* \*